United States Patent
Alanara

(10) Patent No.: US 7,085,991 B2
(45) Date of Patent: Aug. 1, 2006

(54) MOBILE STATION AND METHOD TO TRANSMIT DATA WORD USING AN UNUSED PORTION OF A SLOT BY INTERLEAVING THE DATA WORD WITH A SIGNALLING WORD

(75) Inventor: Seppo Alanara, Tokyo (JP)

(73) Assignee: Nokia Corporation, Espoo (FI)

( * ) Notice: Subject to any disclaimer, the term of this patent is extended or adjusted under 35 U.S.C. 154(b) by 823 days.

(21) Appl. No.: 09/925,071

(22) Filed: Aug. 9, 2001

(65) Prior Publication Data

US 2002/0027893 A1    Mar. 7, 2002

Related U.S. Application Data

(62) Division of application No. 09/061,765, filed on Apr. 16, 1998, now Pat. No. 6,286,122.

(60) Provisional application No. 60/051,716, filed on Jul. 3, 1997.

(51) Int. Cl.
   *H03M 13/03* (2006.01)
(52) U.S. Cl. ............... 714/786; 370/329; 370/476; 370/337; 370/503
(58) Field of Classification Search ........... 714/781, 714/786; 370/329, 476, 337, 503, 528, 468; 455/450, 452.1
   See application file for complete search history.

(56) References Cited

U.S. PATENT DOCUMENTS

| 5,173,927 A | 12/1992 | Strommer et al. ............. 375/81 |
| 5,396,653 A | 3/1995 | Kivari et al. ................. 455/88 |
| 5,430,740 A | 7/1995 | Kivari et al. ............... 371/37.1 |
| 5,557,639 A | 9/1996 | Heikkila et al. ............. 375/224 |
| 5,570,353 A | 10/1996 | Keskitalo et al. ............. 370/18 |
| 5,577,024 A | 11/1996 | Malkamaki et al. .......... 370/18 |
| 5,596,677 A | 1/1997 | Jarvinen et al. ........... 395/2.29 |
| 5,606,548 A | 2/1997 | Vayrynen et al. ........... 370/252 |
| 5,663,957 A * | 9/1997 | Dent ......................... 370/347 |
| 5,708,656 A | 1/1998 | Noneman et al. |
| 5,726,981 A | 3/1998 | Ylitervo et al. |
| 5,745,503 A | 4/1998 | Kuusinen |
| 5,752,201 A | 5/1998 | Kivari |
| 5,764,632 A | 6/1998 | Ylitervo |
| 5,790,534 A | 8/1998 | Kokko et al. |
| 5,790,549 A * | 8/1998 | Dent ......................... 370/479 |
| 5,794,156 A | 8/1998 | Alanara |
| 5,854,978 A | 12/1998 | Heidari |
| 5,859,843 A | 1/1999 | Honkasalo et al. |
| 5,887,252 A | 3/1999 | Noneman |
| 5,924,026 A | 7/1999 | Krishnan |
| 5,924,038 A | 7/1999 | Uistola |
| 5,940,760 A | 8/1999 | Uistola |
| 5,987,324 A | 11/1999 | Peranto et al. |
| 6,064,663 A | 5/2000 | Honkasalo et al. |
| 6,097,961 A | 8/2000 | Alanara et al. |
| 6,170,073 B1 | 1/2001 | Jarvinen et al. |
| 6,212,375 B1 | 4/2001 | Alanara |
| 6,240,304 B1 | 5/2001 | Blankenstein et al. |
| 6,269,331 B1 | 7/2001 | Alanara et al. |

\* cited by examiner

*Primary Examiner*—Guy J. Lamarre
(74) *Attorney, Agent, or Firm*—Harrington & Smith, LLP

(57) ABSTRACT

Disclosed is a mobile station that operates in a circuit switched mode, and a method for operating the mobile station in the circuit switched mode. The method includes generating a data word and transmitting the data word using an unused portion of a slot, that contains an interleaved signalling word, by interleaving the data word with the signalling word.

10 Claims, 5 Drawing Sheets

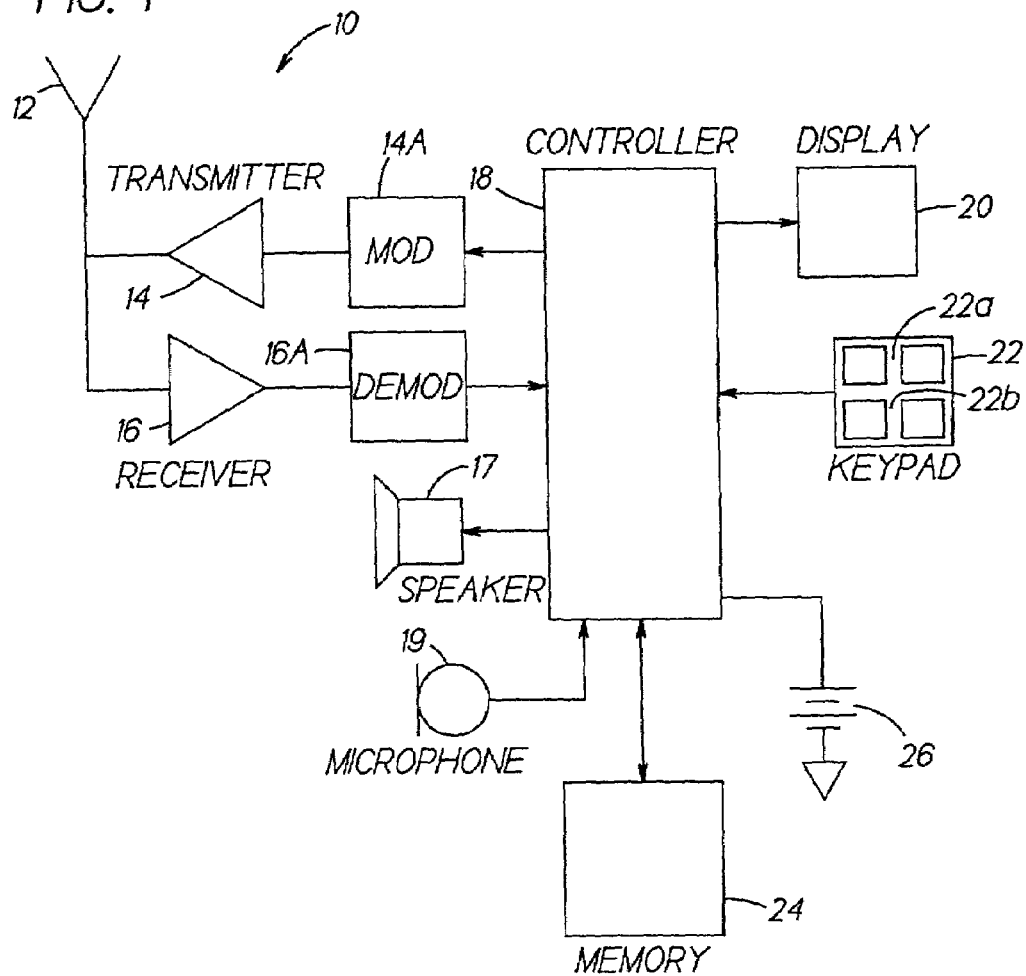
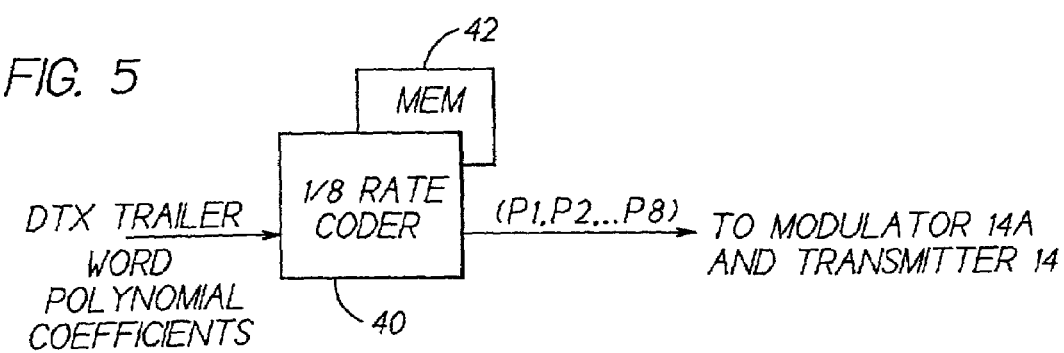

FIG. 4

DTX TRAILER INTERLEAVING

| ROW NUMBER | | | | | | | | | | |
|---|---|---|---|---|---|---|---|---|---|---|
| 1 | 0 | 25 | 50 | 75 | 231 | 89 | 114 | 139 | 164 | 190 |
| 3 | 2 | 27 | 52 | 77 | 233 | 91 | 116 | 141 | 166 | 192 |
| 5 | 4 | 29 | 54 | 79 | 235 | 93 | 118 | 143 | 168 | 194 |
| 7 | 6 | 31 | 56 | 81 | 237 | 95 | 120 | 145 | 170 | 196 |
| 9 | 8 | 33 | 58 | 83 | 239 | 97 | 122 | 147 | 172 | 198 |
| 11 | 10 | 35 | 60 | 85 | 241 | 99 | 124 | 149 | 174 | 200 |
| 13 | 12 | 37 | 62 | 87 | 243 | 101 | 126 | 151 | 176 | 202 |
| 15 | 14 | 39 | 64 | 216 | 245 | 103 | 128 | 153 | 178 | 204 |
| 17 | 16 | 41 | 66 | 218 | 247 | 105 | 130 | 155 | 180 | 206 |
| 19 | 18 | 43 | 68 | 221 | 249 | 107 | 132 | 157 | 182 | 208 |
| 21 | 20 | 45 | 70 | 224 | 251 | 109 | 134 | 159 | 184 | 210 |
| 23 | 22 | 47 | 72 | 226 | 253 | 111 | 136 | 161 | 186 | 212 |
| 25 | 24 | 49 | 74 | 229 | 255 | 113 | 138 | 163 | 188 | 214 |

MOBILE STATION AND METHOD TO TRANSMIT DATA WORD USING AN UNUSED PORTION OF A SLOT BY INTERLEAVING THE DATA WORD WITH A SIGNALLING WORD

This application is a Division of U.S. patent application Ser. No. 09/061,765, filed on Apr. 16, 1998, now U.S. Pat. No. 6,286,122, issued on Sep. 4, 2001, which claims priority under 35 U.S.C. 119(e) from Provisional Patent Application No.: 60/051,716, filed on Jul. 3, 1997, incorporated by reference herein in its entirety.

CLAIM OF PRIORITY FROM A COPENDING PROVISIONAL PATENT APPLICATION

Priority is herewith claimed under 35 U.S.C. §119(e) from copending Provisional Patent Application 60/051,716, filed Jul. 3, 1997, entitled "Method and Apparatus for Transmitting DTX low state Information From Mobile Station to Base Station", by Seppo Alanärä. The disclosure of this Provisional Patent Application is incorporated by reference herein in its entirety.

FIELD OF THE INVENTION

This invention relates generally to radiotelephones and, in particular, to radiotelephones or mobile stations such as those capable of operation with a cellular network.

BACKGROUND OF THE INVENTION

FIGS. 3A–3C depict the frame, normal reverse link slot format, and abbreviated reverse link slot format, respectively, for an exemplary prior art digital Time Division Multiple Access (TDMA) cellular air interface known in the art as IS-136 (see, for example, Section 4.4 of IS-136.1, Rev. A, Mar. 21, 1996 and IS-136.2, Rev. A, Feb. 12, 1996). The reverse link is considered to be in the direction from a mobile station (MS) to a base station (BS), which forms a part of a Base Station/Mobile Switching Center/Interworking function (BMI).

FIG. 3A shows that a 40 millisecond frame consists of six time slots. Slots 1–3 and 4–6 each comprise one TDMA Block. In the reverse direction from the mobile station to the base station, which is a case of most interest to this invention, the frames may be continuously transmitted. A given mobile station is assigned to transmit in one slot per frame for a half data rate case, and is assigned to transmit in two time slots for a full data rate case.

FIG. 1B illustrates one time slot of a Digital Control Channel (DCCH) that is transmitted to the BMI on a reverse channel. The slot starts with a bit guard (G) field, a six bit ramp (R) field, a 16-bit preamble (PREAM) field, and a 28-bit (14 symbol) SYNC word/time slot identifier field. The SYNC word/time slot identifier field is used for slot synchronization, equalizer training, and time slot identification. These fields are followed by two 122-bit DATA fields separated by a an additional synchronization field (i.e., the 24-bit SYNC+ field).

FIG. 1C illustrates one abbreviated time slot of the Digital Control Channel (DCCH) that is transmitted to the BMI on a reverse channel. It can be noted that the second data field is shortened to 78-bits, and a 44-bit abbreviated guard (AG) field is added during which time the mobile station maintains a carrier off condition.

IS-136.1, Rev. A, describes in Section 4.4.3.1 a channel encoding technique, in Section 4.4.3.2 an intraburst interleaving technique for the DATA fields, and in Section 4.4.3.2.2 an interleaving scheme and algorithm for transmitting the encoded data bits of the DATA fields in the normal length burst case of FIG. 1B, and the abbreviated length burst case of FIG. 1C.

Many modern digital cellular communications systems, including IS-136, support a Discontinuous-Transmission (DTX) mode of operation wherein the mobile station transmitter autonomously switches between two transmitter power levels while the mobile station is in a conversation state. By example, the mobile station can enter a DTX_Low power state during a pause in speech, thereby conserving battery power. In the IS-136 system DTX operation can be initiated by the mobile station when on either an analog voice channel or a digital traffic channel, if permitted by the base station in broadcast control channel signalling.

While in the DTX low power state the mobile station may still be required to periodically send channel quality measurements taken on adjacent base stations as a part of a Mobile Assisted Handoff (MAHO) operation. Reference in this regard can be had generally to IS-136.2, Rev. A, Section 2.4.5, and in particular to Section 2.4.5.3 "MAHO Operations with DTX Operation".

Also while in the DTX low power transmitter state the BMI generates so-called "comfort noise" (CN) based on comfort noise parameters that are received from the mobile station. The use of comfort noise insures that the called party will hear a background noise component that is consistent with a normal conversation, as opposed to a complete and unnatural cessation of background noise due to the transmitting mobile station's transmitter being turned off or substantially reduced in power.

If the base station requires, the mobile station may not ramp down to the lowest possible transmitter power level, but may instead maintain a predefined minimum transmitter power such that adjacent base stations are able to use so-called digital locate receivers to monitor the mobile station's transmissions for power measurement and/or other purposes. In true DTX, the mobile station can completely terminate transmissions, thereby conserving a maximum amount of mobile station power.

However, the system specification defined in IS-136.1 and IS-136.2 does not include any definitive way for the mobile station to indicate to the BMI the beginning of the DTX mode. As a result, a decoder in the BMI cannot readily determine whether to employ bad frame masking because of lost slots due to fading (See IS-136.2, Section 2.2.2.2.3.2), or whether to generate comfort noise based on CN parameters. In addition, the BMI cannot locate the so-called hang-over slots, on which the BMI computes basic parameters for the background noise. The location of the hangover slots is important, since if the BMI does not receive the comfort noise parameters in the beginning of the slot, it must use the previously derived comfort noise until the next comfort noise parameters are received.

Due to the above-mentioned interleaving, the data bits of a last slot that is transmitted before entering the DTX_Low State have been unused. Currently in IS-136 a two slot interleaving technique is used (see IS-136.2, FIG. 2.1.3.3.3.2-1 and Section 2.1.3.3.4), which leaves 130 bits (half of a 260 bit slot) unused in the last slot. The last slot transmitted is typically a Fast Associated Control Channel (FACCH) slot, which is defined as a blank-and-burst channel used for signalling exchange between the mobile station and the base station.

It has been proposed in IS-136 (see contribution TR45.3.5/97.03.25.04) that a 68-bit truncated slot be used as a transmit (TX) slot when the mobile station is in the DTX_Low State. A revised contribution in this regard is TR45.3.6/97.06.10. Comfort Noise parameters have been proposed to be carried as FACCH messages on the FACCH channel.

In the existing Global System for Mobile Communication (GSM) DTX operation, the entry to the DTX mode is indicted by CN parameters sent with inband signaling. However, if for some reason this inband signalling is not received, the BMI will execute the bad frame masking procedure that repeats previous speech frames. In IS-136 the CN parameters are sent as FACCH messages, and similarly if the BMI fails to receive the CN parameters, or some other indication of the mobile station's entry to the DTX mode, the BMI will enter the bad frame masking procedure (see IS-136.2, Section 2.2.2.2.3.2).

As can be appreciated, the failure by the BMI to determine when the mobile station has entered the DTX mode can result in an objectionable audible signal being generated due to the repeating of the last received (good) speech frame.

A further existing problem of the DTX mode as currently specified relates to the number of slots that must be sent from the mobile station to the BMI while the mobile station is in the DTX_Low State. These slots are used, typically, for sending the CN parameters.

OBJECTS AND ADVANTAGES OF THE INVENTION

It is an object and an advantage of this invention to provide an improved method for transitioning a mobile station and BMI into the DTX mode of operation.

It is a further object and an advantage of this invention to provide an improved method for operating a mobile station and a BMI in the DTX mode of operation.

It is another object and advantage of this invention to provide a method to send Comfort Noise parameters from the mobile station to the base station without incurring additional transmitter load, over the load required for the transmission of Mobile Assisted Handoff (MAHO) measurements (Channel Quality) information.

SUMMARY OF THE INVENTION

The foregoing and other problems are overcome and the objects and advantages are realized by methods and apparatus in accordance with embodiments of this invention.

A method of this invention is disclosed for operating a mobile station, and includes the steps of, prior to transmitting a burst in a last frame before entering a discontinuous transmission (DTX) mode, generating a message word that indicates that the mobile station is about to enter the DTX mode. In one embodiment the method further includes the steps of using a predetermined generator polynomial to produce an error detection word from the message word; combining the message word and the error detection word into a DTX Trailer word; and convolutionally encoding the DTX Trailer word. The method further includes the steps of interleaving the DTX Trailer word with unused bits of slot containing a speech or a signalling word; and transmitting the interleaved DTX Trailer word to the BMI.

In a presently preferred embodiment of this invention the message word has a length of eight bits, the error detection word is an eight bit CRC that is appended to the message word to form the DTX Trailer word, and the DTX Trailer word is error protected using a rate $1/8$ convolutional encoder.

In other embodiments the message word can be represented by predetermined bits, and is transmitted without being convolutionally encoded or error protected.

Further in accordance with this invention the method provides a technique to send information, such as control information, from the mobile station to the base station by employing unused channel capacity, due to interleaving, when transitioning from the DTX_High state to the DTX-Low state (or vice versa).

In accordance with a presently preferred embodiment of this invention the mobile station periodically combines a Comfort Noise Parameter message with a Channel Quality Measurement message and transmits, over a FACCH, the combined messages from the mobile station to the base station while in the DTX_Low state.

When in the DTX_Low state, the mobile station may periodically transmit an Abbreviated Slot to the base station at intervals specified by the base station. The base station may vary the interval between transmissions, or may command the mobile station to terminate the transmission of Abbreviated Slots.

This invention further teaches a method for operating a mobile station in a circuit switched mode, comprising the steps of (a) generating a data word, such as keystroke data entered by a user; and (b) transmitting the data word, using an unused portion of a slot containing an interleaved signalling word, by interleaving the data word with the signalling word. In one embodiment the signalling word conveys radio channel measurement information from the mobile station to the base station.

Also disclosed is a method for operating a mobile station that includes the steps of, (a) prior to entering a discontinuous transmission (DTX) mode low power (DTX_Low) state, transmitting a Comfort Noise Block, without interruption, and all pending Fast Associated Control Channel (FACCH) messages from the mobile station to the base station; (b) entering the DTX_Low state; and (c) when in the DTX_Low state, periodically transmitting an Abbreviated Slot to the base station at intervals specified by the base station.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a block diagram of a mobile station that is constructed and operated in accordance with this invention;

FIG. 4 illustrates a DTX Trailer Interleaving technique in accordance with an embodiment of this invention;

FIG. 5 is a block diagram of a $1/8$ rate convolutional encoder used by the method of this invention to encode DTX Trailer Words.

DETAILED DESCRIPTION OF THE INVENTION

Figure 2:
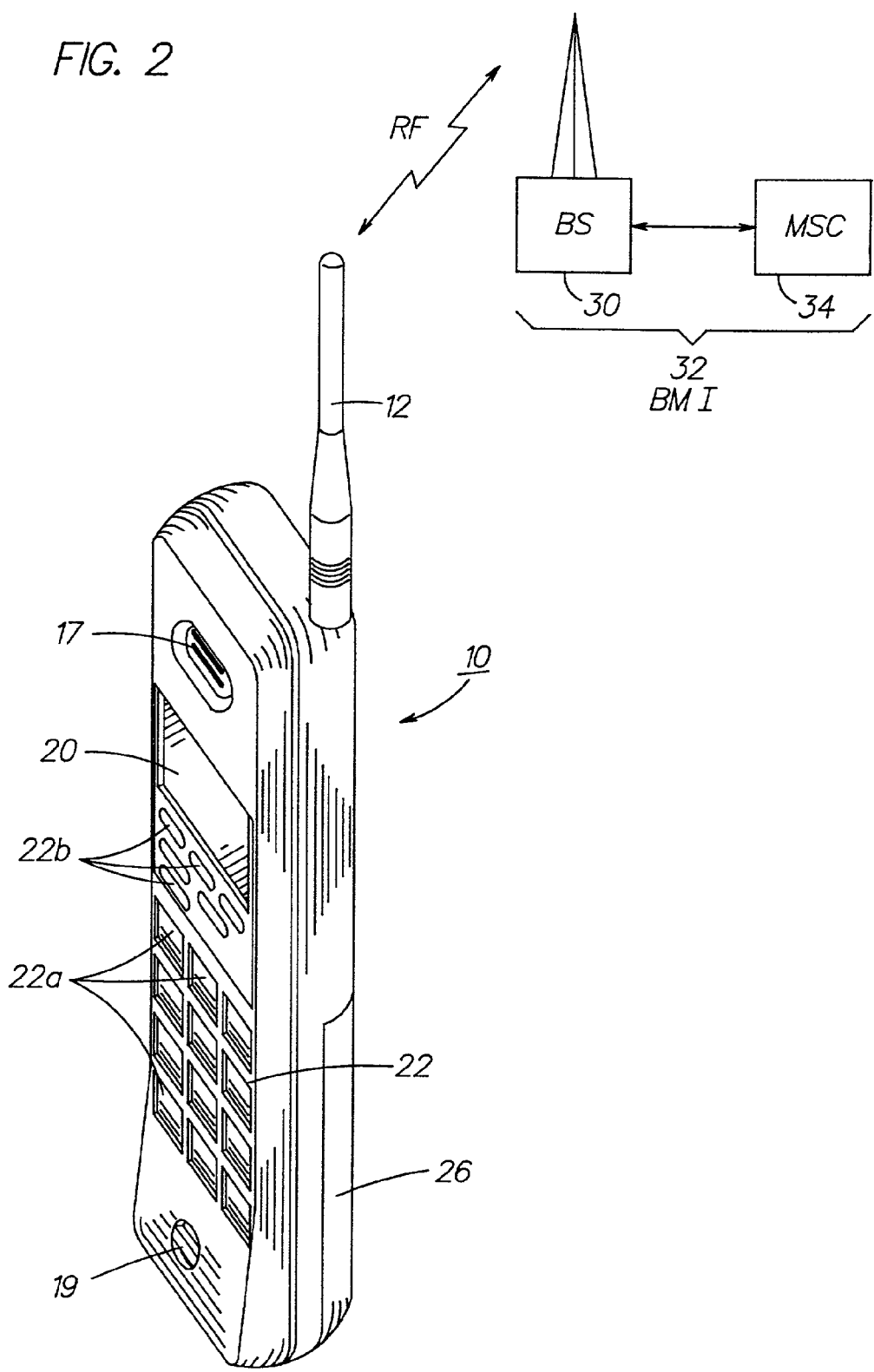
FIG. 2 is an elevational view of the mobile station shown in FIG. 1, and which further illustrates a cellular communication system to which the mobile station is bidirectionally coupled through wireless RF links.

Before describing this invention in detail, reference is first made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising the Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile station, or for use only in TDMA or analog/TDMA type systems. The mobile station 10 is assumed to be capable of operating in the DTX mode, and the BMI 32 is assumed to be capable of generating comfort noise and otherwise accommodating the DTX mode of operation of the mobile station 10. The comfort noise is generated based on comfort noise parameters transmitted to the base station 30 from the mobile station 10, as described in detail below.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities. The controller 18 thus also includes the functionality to convolutionally encode and interleave message and data prior to modulation and transmission.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#, *) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, and the teaching of this invention is not to be construed to be limited to any one particular type of mobile station or air interface standard.

The operating program in the memory 24 may include routines to present messages and message-related functions to the user on the display 20, typically as various menu items. The memory 24 also includes routines for implementing the methods described below.

This invention teaches, in a first aspect, a method for enhancing the DTX operation of a mobile station operated in a cellular network, in which an interleaving of data in slots is used in a traffic channel communication.

Briefly, when the mobile station 10 enters the DTX state, a previously unused portion of the last slot (due to interleaving) is used for indicating to the BMI 32 that the mobile station 10 is about transfer to the DTX state.

Furthermore, the previously unused portion of the last slot can be used by the mobile station 10 to inform the BMI 32 of information regarding the DTX mode, such as a version of a preferred CN generation process.

Also, the interleaving of the free portion of a slot can be changed from an already specified interleaving scheme.

In addition, information transmitted from the BMI 32 can be used to set the DTX mode of the mobile station. The DTX mode can be one of, by example, true DTX (transmitter off), skip four slots, or skip 16 slots and send a truncated burst in every assigned slot. That is, the mobile station 10 can be set to use truncated slots at every assigned slot, or at a predetermined rate, or can be prohibited from sending any truncated slots (true DTX mode).

To make the channel coding of the free portion of the last slot more resistive to channel errors, a ⅛ rate convolutional coding technique can be employed by the controller 18. This results in a payload of eight bits for CRC and eight data bits. While the channel is currently designed for a Bit Error Rate (BER) value of 3%, a 6% BER performance requirement implies the use of at least ⅛ rate channel coding using eight polynomials (i.e. four additional polynomials over the currently specified FACCH convolutional coding polynomials. The use of eight data bits allows 256 codes to be sent from mobile station 10 to the BMI 32. In accordance with an aspect of this invention, one of these codes can be dedicated to provide a definitive indication to the BMI 32 of the start of the DTX mode, and one or more of the remaining codes can be used to dynamically alter the truncated burst mode.

It is within the scope of this invention to indicate the start of DTX without using a CRC, and to instead use a known bit pattern, such as a channel coded with ½ rate convolutional encoding. One example of ½ rate convolutional coding is used for speech in IS-136.2. It is, however, possible to use the known bit pattern w channel coding, and to then specify a maximum number of bit errors to allow operation with a noisy radio channel.

For example, in an embodiment of this invention the free bit portion is used in conjunction with ½ rate, or ¼ rate, or even no channel coding. At the BMI base station receiver the decoded 65 bits, or 32 bits, or 130 bits, respectively, are then compared to a known bit pattern, and an erroneous bit count is used to indicate whether what was received was a bad partial frame, or an indication of a change to the DTX mode. The bit error limit can be based on channel simulations.

It should be appreciated that the teachings of this invention can be applied, with suitable modifications, as well to GSM-based systems, wherein interleaving is performed over four slots.

In further detail, this invention provides in a first aspect a novel data stream format for the unused portion (130 bits) of the last TDMA slot before entering the DTX_Low or a Truncated Burst sending mode of operation.

In accordance with a data stream format of this invention a DTX Trailer block replaces (is used in place of) the user information block whenever it is to be transmitted. Each DTX Trailer block is regarded as one signaling word, and a FACCH message can consist of more than one such word. Messages that span multiple FACCH words can be interspersed with one or more transmissions containing user information.

The DTX Trailer is interleaved as FACCH bursts, but using only the odd numbered 10 bit rows in the last transmission burst. More precisely, the mapping of bits from the two bursts into bits presented sequentially to the input of the convolutional decoding process can be either the one used for the FACCH or for the coded speech bits. However, to facilitate the future implementation of new speech coders, it may be preferred to use the FACCH interleaving process, which is not expected to change.

Sequential DTX Trailer bits are numbered 0 to 129 in the order they emerge from a rate ¼ convolutional encoder, and are placed in the interleaving array using, first, those positions otherwise occupied by coded class 1 speech bits, and in the same order. When all positions normally occupied by coded speech bits have been used, the positions normally used by uncoded speech bits are then used, but in a different order.

Bits 0 to 259 are interleaved according to FIG. 4. The bits are transmitted from the interleaving array of FIG. 4 along rows from left to right, using only odd numbered rows from a current frame alternately with even numbered rows of the previous frame, which may be a similar speech or FACCH block. The even numbered rows of an interleaved FACCH block constructed from the frame are transmitted in the next burst, alternating with odd numbered rows from the following block, which may also be speech or FACCH.

Figures 3A, 3B, 3C, 3D:
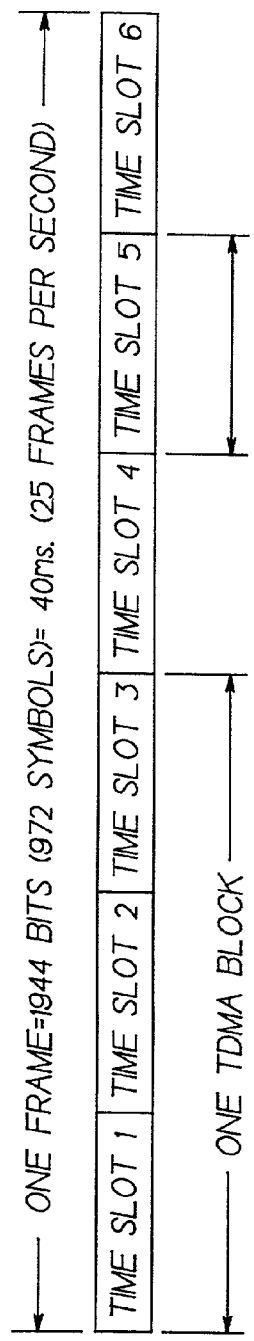
FIGS. 3A–3C depict the frame, normal reverse link slot format, and abbreviated reverse link slot format, respectively, for an exemplary prior art digital TDMA cellular air interface.
FIG. 3D depicts the format of a DTX Trailer Word in accordance with this invention.

With regard to error detection and a Digital Verification Color Code (DVCC) identifier, the following is noted. The 8-bit CRC is placed after 8 information bits, as is shown in FIG. 3D.

Let $a(X) = message[0]X^7 + message[1]X^6 + \ldots + message[7]X^0$.

Message[0] is the most significant bit (see IS-136.2, Section 1.2.5 "Coded Digital Verification Color Code (CD-VCC)" and Section 2.1.3.3.3.4 "Convolutional Encoding")), where message[N] is the Nth bit of the message field in a DTX Trailer word.

The parity polynomial is the remainder of the division of the input polynomial a(X) and the generator polynomial, i.e.:

$$(a(X)X^{16})/(X^8+X^5+X^4+X^3+1) = q(X) + (b(X))/(X^8+X^5+X^4+X^3+1)$$

where q(X) is the quotient of the division and b(X) is the remainder. The quotient is discarded and only the parity bits are transmitted. Those skilled in the art may recognize that the generator polynomial is a shortened version of the polynomial used on Analog Voice and Control Channels (see the definition in IS-136.2, Section 3.7.1).

$$\text{Let } c(X) = C[0]X^{15} + C[1]X^{14} + C[2]X^{13} + \ldots + C[64]X^0$$
$$= message[0])X^{15} + \ldots + (message[7])X^8 + b(X)$$

where message[N] is the Nth bit of the message field in a DTX Trailer word. The coefficients of the polynomial c(X) are fed sequentially to a convolutional encoder 40 (see FIG. 5) in the order C[0], C[1], . . . C[15].

In accordance with an aspect of this invention, the DTX Trailer data is error protected by means of a rate ⅛ convolutional code. The coding uses the same start and end bit (tail-biting), instead of extra bits, to avoid the overhead introduced with explicit tail bits.

Referring to FIG. 5, the data bits to be encoded are shifted through a rate ⅛ convolutional coding circuit 40. Each new data bit shifted in results in four parity bits being shifted out of the coder 40, the output bits being designated as (P1, P2, P3, P4, P5, P6, P7, P8). One such bit quadruple is produced as a result of shifting in one new data bit. Each of the four parity bits is a different logical function of the new data bit and the five data bits previously shifted in. Denoting the new data bit by D(i) and denoting the earlier data bits by D(i−1), D(i−2), D(i−3), D(i−4) and D(i−5), the defining equations for (P1, P2, P3, P4, P5, P6, P7, P8) are as follows:

$P1 = D(i) + D(i-1) + D(i-3) + D(i-4) + D(i-5)$ $P2 = D(i) + D(i-1) + D(i-2) + D(i-5)$ $P3 = D(i) + D(i-1) + D(i-2) + D(i-3) + D(i-5)$ $P4 = D(i) + D(i-2) + D(i-4) + D(i-5)$ $P5 = D(i) + D(i-2) + D(i-3) + D(i-5)$ $P6 = D(i) + D(i-3) + D(i-4) + D(i-5)$ $P7 = D(i) + D(i-1) + D(i-2) + D(i-4) + D(i-5)$ $P8 = D(i) + D(i-1) + D(i-3) + D(i-5)$ where + represents modulo 2 addition (XOR).

A memory (MEM) 42 of the channel coder 40 is initialized by the controller 18 with the first six bits according to the following:

| D(i) | D(i−1) | D(i−2) | D(i−3) | D(i−4) | D(i−5) |      |
|------|--------|--------|--------|--------|--------|------|
| C[5] | C[4]   | C[3]   | C[2]   | C[1]   | C[0]   | bits |

The first bit quadruple (P1, P2, P3, P4) is then generated and extracted. The input bits are then shifted through the coder memory so that bit C[0] shifts out, bit C[1] replaces bit C[0], bit C[5] replaces bit C[4] and a new bit (bit C[6]) replaces bit C[5] in D(i). After this shift the memory 42 content is as follows:

| D(i) | D(i-1) | D(i-2) | D(i-3) | D(i-4) | D(i-5) | |
|------|--------|--------|--------|--------|--------|------|
| C[5] | C[4]   | C[3]   | C[2]   | C[1]   | C[0]   | bits |

Another quadruple (P1, P2, P3, P4) is then extracted and likewise, after every subsequent shift until after 10 shifts, the state of the encoder 40 is as follows:

| D(i)  | D(i-1) | D(i-2) | D(i-3) | D(i-4) | D(i-5) | |
|-------|--------|--------|--------|--------|--------|------|
| C[15] | C[14]  | C[13]  | C[12]  | C[11]  | C[10]  | bits |

The bits with index 0 to 4 are then used again in that order, shifting in to the coder 40 from the left with extraction of a bit quadruple after every shift. After these five last shifts the encoder memory 42 contains:

| D(i) | D(i-1) | D(i-2) | D(i-3) | D(i-4) | D(i-5) | |
|------|--------|--------|--------|--------|--------|------|
| C[4] | C[3]   | C[2]   | C[1]   | C[0]   | C[64]  | bits |

Thus, after one further shift the state of the encoder 40 will have returned to the starting state. The data bits can be visualized as being stored in a 16-stage circular buffer which is rotated one revolution so that every bit successively appears in the position corresponding to D(i−5).

The fields are presented to the DTX Trailer convolutional encoder 42 in the order starting from the signaling word header. Bits within a field are presented to the coder 42 in the order of most significant bit (MSB) first. Each word is formatted as shown in FIG. 3D.

The 8-bit message field was described above. The 8 data bits of the message field in the DTX Trailer word is appended with the 8-bit CRC to detect the presence of channel errors in the data, as well as to provide a mechanism for distinguishing the DTX Trailer data from speech data. For explanatory purposes, one method of differentiating between speech blocks and DTX Trailer blocks is to utilize the information present in the respective CRC fields.

Figure 6:
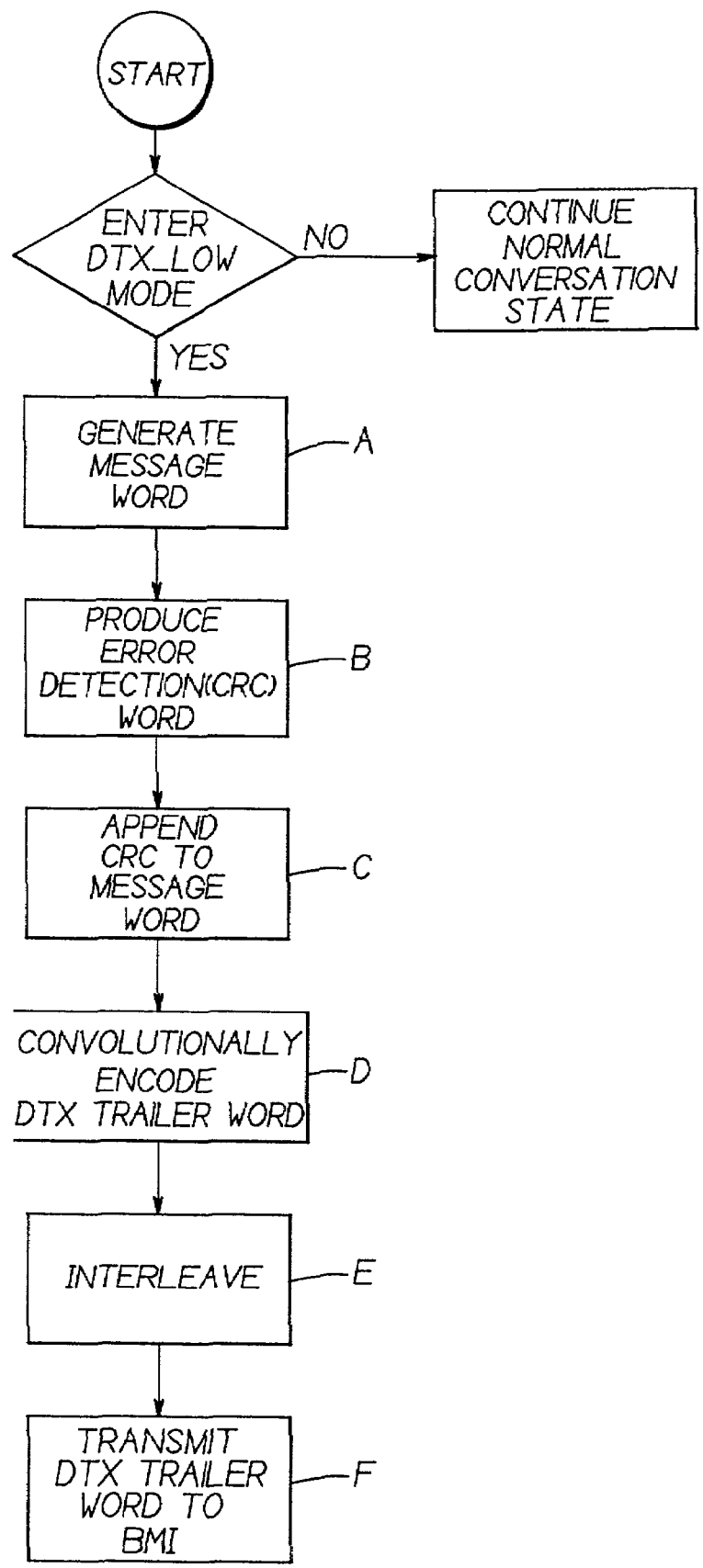
FIG. 6 is a logic flow diagram that illustrates a method in accordance with this invention.

Referring to FIG. 6, this invention thus provides a method for operating the mobile station 10, and includes the steps of, prior to transmitting a burst in a last frame before entering a discontinuous transmission (DTX) mode, generating a message word that indicates that the mobile station is about to enter the DTX mode (Block A); using a predetermined generator polynomial to produce an error detection word from the message word (Block B); and combining the message word and the error detection word into a DTX Trailer word (Block C), having a format shown in FIG. 3D. The method further includes the steps of convolutionally encoding the DTX Trailer word (Block D); interleaving the DTX Trailer word with a speech or a signalling word, as in FIG. 4 (Block E); and transmitting the interleaved DTX Trailer word to the BMI 32 (Block F).

In a further aspect this invention provides an improved technique to transmit CN parameters to the base station 30, by using the MAHO FACCH message train. More particularly, and for the system specified by EIA/TIA IS-136 parts 1 and 2 (and similar systems), a preferred approach is to utilize the available 130 bits at the beginning and end of the MAHO FACCH message train. This is accomplished by sending the latter half of 260 bits in the 130 unused bits of the first FACCH slot position, and the former half in the 130 unused bits of the last FACCH slot in the MAHO FACCH message train. For the last slot before entering the DTX_Low State, the unused 130 bits can be changed to use a different intra-slot interleaving, e.g., ¼ rate convolutional coding employed for the regular FACCH messages. Using the ¼ rate convolutional coding and a 16-bit FACCH CRC, the result is 16 usable bits. One value of this 16-bit field is defined to indicate the beginning of the DTX_Low State to the base station 30.

An alternative method uses these additional bits with any suitable channel coding to carry any other control information to the base station 30.

While it is also possible to change the interleaving of the intermittent MAHO FACCH Message train, this approach is not as effective, and may create a problem when the DTX_High State is entered immediately after the MAHO FACCH Message Train.

The preferred method can be used in any system employing an interleaved Traffic Channel within a DTX system, such as GSM.

In greater detail, the method uses a modified Abbreviated Slot, which may be sent in all assigned mobile station slots when in the DTX_Low State. As the network allows, the base station 30 may enable the mobile station 10 to gradually terminate the transmission of Abbreviated Slots. This is controlled by an optional information element in, by example, the Digital Traffic Channel Designation, Handoff and Physical Layer Control Messages. This optional information element gives a count of mobile station transit slots that can be skipped by the mobile station 10. At least two bits are dedicated for this purpose, although the use of more bits gives greater control.

The Abbreviated Slot as used herein does not carry any control information from the mobile station 10 to the base station 30 so as to enable the gradual upgrade of the system to full DTX operation. All control information (e.g., MAHO results and CN Parameters) are carried instead by FACCH messages.

The DTX Skip Length information element (two bits) can indicate the Abbreviated Slot TX requirement in the manner shown below:

| Description | Code |
|-------------|------|
| send Abbreviated Slot at every assigned slot | 00 |
| send Abbreviated Slot at every 4th slot | 01 |
| send Abbreviated Slot at every 16th slot | 10 |
| no Abbreviated Slot required | 11 |

| 6 bits | 28 bits | 12 bits | 6 bits |
|--------|---------|---------|--------|
| R      | SYNC    | CDVCC   | R      |

Note that the timing of this slot is delayed eight symbols to align it with adjacent slot synchronization bits in the TDMA Frame. With the ramp-up and ramp-down bits (R) the length of the Abbreviated Slot is 52 bits. If desired, a short (3 symbol) preamble having, for example, bits 101010 can be added.

When the mobile station 10 is in the DTX_Low State, sending the MAHO FACCH messages at a rate specified by the base station 30 (for example, at 0.5 or 1 second intervals), the two slot interleaving causes 130 bits to be unused both in the beginning and end of the message train. These unused bits are utilized, in accordance with an aspect of this invention, by reversing the order of x-bits and y-bits sent in the interleaved CN Parameter Message, and sending the MAHO FACCH message train in a regular manner (see Section 2.1.3.3.4 of IS-136.2) Using this method, one full slot transmission can be saved, resulting in greater savings in the mobile station DTX_Low CN-transmission. With a 0.5 second CN update interval, and if there is more than one channel quality measurement (CQM) to be sent, the messages can be arranged such that the first CQM is sent together with the CN parameters. In this way the CQM can always utilize the unused interleaver bits over at least two slots of interleaving. In the event that there is only one CQM message, and the CN parameters are transmitted at the 0.5 second interval, and every other CQM message is sent in a single TDMA slot. In this case the intra-slot interleaving is utilized.

In the DTX-Low state the transmitter 14 either remains off, and the CDVCC is not sent except for the transmission of FACCH messages, or, in accordance with this invention, Abbreviated Slots are transmitted at intervals defined by the above-defined DTX Skip Length parameter. All SACCH messages to be transmitted by the mobile station 10 in the DTX_Low state are sent instead as a FACCH message, after which the transmitter 14 is returned to the off state, unless DTX has been otherwise inhibited.

Using this technique it is estimated that the battery savings during the DTX_Low state can be improved by about 20% to 30%, depending on how many FACCH slots are used for MAHO transmission.

Based on the foregoing it can be realized that this invention teaches a method and system for formulating a message to indicate that the mobile station 10 is about to enter the DTX_Low state, and that then interleaves this message with unused bits of a last message transmitted before entering the DTX_Low state. By receiving the message, the base station 30 is able to obtain knowledge of the mobile station 10 entering the DTX_Low state.

This invention thus utilizes free bits due to an existing interleaving scheme. In interleaving the information of one logical frame is spread over two physical frames. When the mobile station 10 detects a silent moment in speech (e.g. based on information from a voice activity detector (VAD) function), the mobile station 10 begins to transition into the DTX_low state. At the end of all hangover slots and CN parameters there are, due to interleaving, some number (e.g., 130) of unused bits. These bits can be used, in accordance with an aspect of this invention, to notify the BMI 32 that the mobile station 10 has entered the DTX_Low state.

While the mobile station 10 is in the DTX_Low state (typically transmitting CQM results and CN parameters), it again has unused bits both at the beginning and at the end of CQM results (sent on FACCH). In this case the mobile station 10 uses the free bits to send CN parameters (or a single frame of any FACCH message) so that half of the bits (e.g., 130 are sent in advance in the unused portion of the starting FACCH burst. In this case the heading and trailing parts of the frame are only a few slots away from one other.

In general, this invention teaches the use of otherwise unused slots that, due to interleaving, happen to be part of mobile-transmitted bursts, either while entering the DTX_Low state or while in the DTX_Low state. This invention teaches the use of these unused (free) bits for 1) sending channel quality information, 2) CN parameters, and/or 3) the DTX Trailer Word information. In principle any control type of information can be sent in either case, i.e., when entering the DTX_Low state and when in the DTX_Low state.

As one further example of the utility of this invention, if an internet connection is active in the mobile station 10, and the mobile station 10 is transmitting only very little data on the reverse link (e.g., only a keystroke that is occasionally entered by the user), while the forward link is being heavily utilized to download information (e.g., to download web pages), the reverse link keystroke data can be interleaved with the messages required to be sent during the DTX_Low state (typically CQM).

Unused bits can be utilized so that the first part of a particular information frame (e.g. a CN parameters frame) is transmitted using the unused portion of the last normal length burst at the time mobile station 10 enters the DTX_Low state, and the next part of the particular information frame is transmitted after, by example, 0.5 or 1.0 second, when the next CQM message is transmitted.

In general, the teaching of this invention applies as well to a mobile station operating the Data mode, such as when a circuit switched data connection specified by IS-130 and IS-135 is used. In this case there is a possibility for the mobile station 10 to not transmit slots if only null slots are available for transmission. This may occur when the internet is accessed, since the mobile station 10 may only occasionally send HTML codes to the network server, while the network server sends a significant amount of data to the mobile station 10. In the case of such a circuit switched connection there is no need to send CN data or hangover slots to the BMI 32, and the power savings are increased. It may also be beneficial for network to obtain information as to when the mobile station 10 enters the DTX_Low state. The user generated HTML strings can be sent with the MAHO information using the available free bits in the beginning and ending slots.

By applying a more optimal channel coding scheme in accordance with an aspect of this invention the information can be sent as reliably as when using the normally specified interleaving scheme.

The power saving effect results directly from using the free bit capacity that previously has been unused. By example, the transceiver of the mobile station 10 can be shut off earlier than would be possible without the use of this invention.

Although described in the context of preferred embodiments, it should be realized that a number of modifications to these teachings may occur to one skilled in the art.

By example, and as was stated, the teaching of this invention can be employed to send any type of desired information from the mobile station 10 to the base station 30, and is not limited to sending only CN parameters and/or CQM in an unused portion of a frame. Furthermore, the teachings of this invention can also be applied when transitioning from the DTX_Low to the DTX_High states, in IS-136 and GSM systems by example, as unused frame capacity will also be present due to interleaving.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station in a circuit switched mode, comprising the steps of:
   generating a data word; and
   transmitting the data word using an unused portion of a slot, containing an interleaved signalling word, by interleaving the data word with the signalling word.

2. A method as in claim 1, wherein the signalling word conveys radio channel measurement information from the mobile station to a base station.

3. A method as in claim 1, wherein the data word conveys a user-entered keystroke.

4. A method as in claim 1, wherein the data word conveys a HTML code.

5. A method as in claim 1, wherein the data word includes a message word and an error detection word.

6. A method as in claim 5, wherein the message word indicates that the mobile station is about to enter a discontinuous transmission mode.

7. A method as in claim 5, wherein a predetermined generator polynomial is used to produce the error detection word.

8. A mobile station comprising an RF transceiver, a user interface and a controller for operating said mobile station in a circuit switched Data mode during an internet connection, said controller being responsive to at least one HTML code being generated for transmitting the at least one HTML code within an unused portion of at least one reverse link time slot by interleaving the HTML code with a mobile station generated signalling word.

9. A mobile station as in claim 8, wherein the signaling word conveys Mobile Assisted Handoff (MAHO) information.

10. A method for operating a mobile station in a circuit switched Data mode during an internet connection, comprising the steps of:
    generating at least one HTML code; and
    transmitting the at least one HTML code within an unused portion of at least one reverse link time slot by interleaving the HTML code with a mobile station signalling word.

* * * * *